United States Patent [19]

Shimatani

[11] Patent Number: 5,517,325
[45] Date of Patent: May 14, 1996

[54] DIRECT MEMORY ACCESS (DMA) CONTROLLER WITH PROGRAMMABLE BUS RELEASE PERIOD FOR TIMING DMA TRANSFERS

[75] Inventor: Akira Shimatani, Osaka, Japan

[73] Assignee: Mita Industrial Co., Ltd., Osaka, Japan

[21] Appl. No.: 395,873

[22] Filed: Feb. 28, 1995

[30] Foreign Application Priority Data

Mar. 10, 1994 [JP] Japan .................................. 6-039562

[51] Int. Cl.⁶ .............................. H04N 1/21; G06F 13/16; G06F 13/28; G06F 13/362
[52] U.S. Cl. ...................... 358/444; 358/468; 395/842; 395/845; 395/287; 395/293
[58] Field of Search .................................. 358/444, 468; 370/85.2, 3, 6, 8; 395/842, 848, 304, 297, 845, 855, 287, 293

[56] References Cited

U.S. PATENT DOCUMENTS

| | | | |
|---|---|---|---|
| 4,635,191 | 1/1987 | Böing | 395/842 |
| 5,193,193 | 3/1993 | Iyer | 395/297 |
| 5,297,242 | 3/1994 | Miki | 395/842 |

*Primary Examiner*—Scott A. Rogers
*Assistant Examiner*—Shahreen Ali
*Attorney, Agent, or Firm*—Beveridge, DeGrandi Weilacher & Young

[57] ABSTRACT

The present invention relates to an image data transfer controller. In the present invention, transfer processing for acquiring a right to control a bus and performing DMA transfer of image data corresponding to a set number of data to be continuously transferred and bus release processing for releasing the acquired right to control a bus during a set bus release period are repeatedly performed until a predetermined number of image data are transferred. The set value of the number of data to be continuously transferred and the set value of the bus release period are changed on the basis of the state of a request to use the bus.

5 Claims, 4 Drawing Sheets

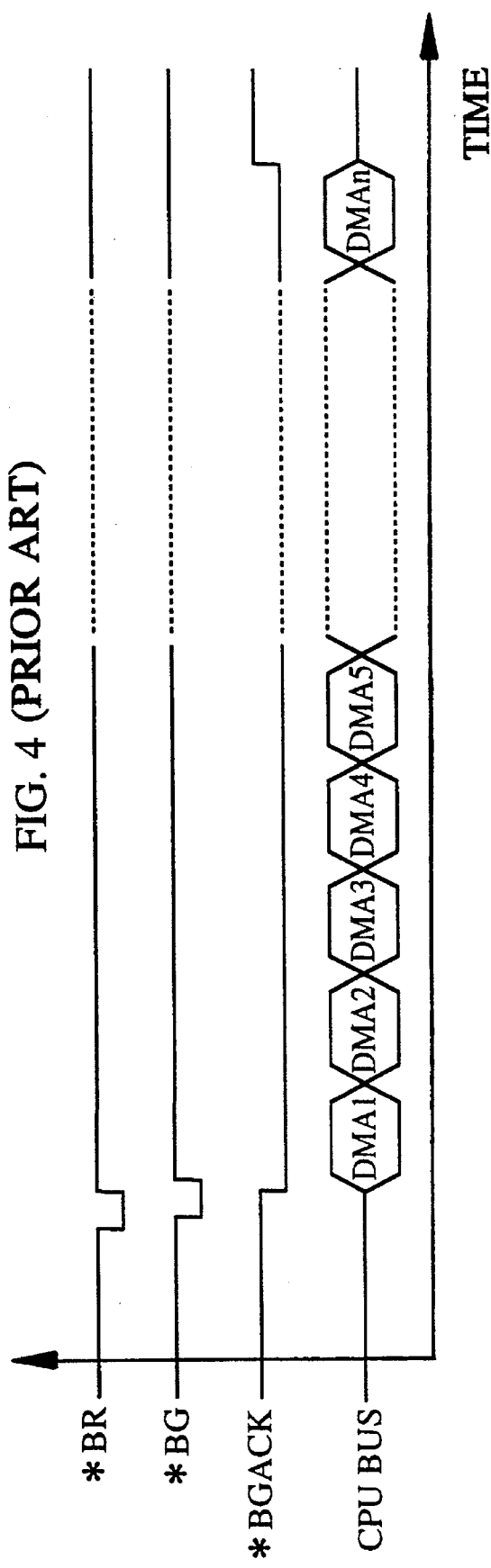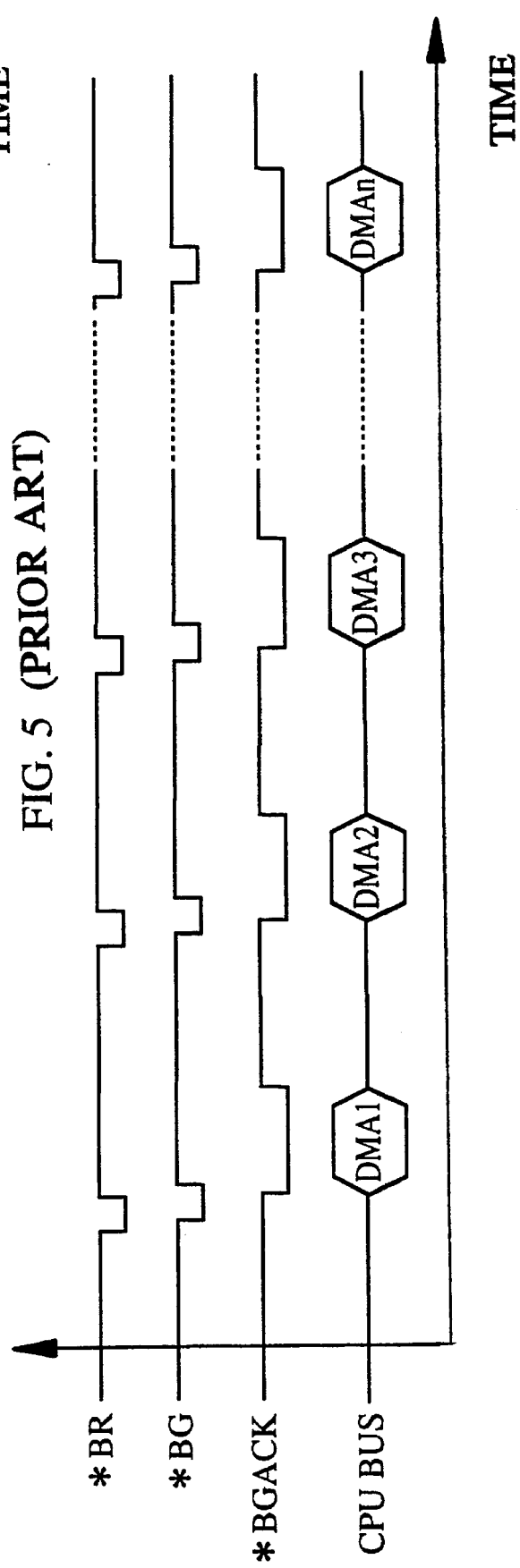

DIRECT MEMORY ACCESS (DMA) CONTROLLER WITH PROGRAMMABLE BUS RELEASE PERIOD FOR TIMING DMA TRANSFERS

BACKGROUND OF THE INVENTION

1. Field of the Invention

The present invention relates to an image data transfer controller.

2. Description of the Prior Art

Examples of an image forming apparatus such as a facsimile include one comprising a CPU (Central Processing Unit) which is a main control unit and the other control unit such as an image processing unit to be a bus master. In such an image forming apparatus, image data stored in a memory is subjected to image processing by the image processing unit, and the image data after the image processing is stored in the other memory. As data transfer between the memory and the control unit such as the image processing unit, DMA (Direct Memory Access) is generally used so as to perform transfer at high speed.

Examples of conventional DMA transfer include burst transfer in which transfer is continuously performed until a required number of image data are transferred after a right to control a bus is acquired, as shown in FIG. 4, or a cycle steal transfer in which a right to control a bus is acquired for each transfer and transfer is performed every time the right to control a bus is acquired, as shown in FIG. 5.

In FIGS. 4 and 5, a bus request signal *BR is a request to release a bus which is inputted to a CPU which is a main control unit of a facsimile from the other control unit such as an image processing unit. If the other control unit desires to use the bus, this signal is asserted. A bus grant signal *BG is a signal asserted by the CPU so as to inform, when the CPU releases the bus on the basis of the bus request signal *BR, the other control unit of the release.

A bus grant acknowledge signal *BGACK is a signal asserted by the other control unit when the other control unit issuing the request to release a bus knows that the bus is released by the bus grant signal *BG. The other control unit becomes a bus master while asserting the bus grant acknowledge signal *BGACK.

In the burst transfer, the CPU and the other device cannot use a CPU bus during a transfer period. When another important processing occurs, therefore, the processing cannot be performed, resulting in an inferior operation.

On the other hand, in the cycle steal transfer, an operation for acquiring the right to control a bus is frequently performed, whereby it takes longer to transfer all data.

SUMMARY OF THE INVENTION

An object of the present invention is to provide an image data transfer controller for performing efficient DMA transfer corresponding to the state of a request to use a bus.

A first image data transfer controller according to the present invention is characterized by comprising setting means for setting the number of data to be continuously transferred and a bus release period, DMA transfer processing means for repeatedly performing transfer processing for acquiring a right to control a bus and performing DMA transfer of image data corresponding to the set number of data to be continuously transferred and bus release processing for releasing the acquired right to control a bus during the set bus release period until a predetermined number of image data are transferred, and set value changing means for monitoring the state of a request to use the bus and changing the set value of the number of data to be continuously transferred and the set value of the bus release period on the basis of the state of the request to use of the bus.

In the first image data transfer controller according to the present invention, transfer processing for acquiring a right to control a bus and performing DMA transfer of image data corresponding to a set number of data to be continuously transferred and bus release processing for releasing the acquired right to control a bus during a set bus release period are repeatedly performed until a predetermined number of image data are transferred. The set value of the number of data to be continuously transferred and the set value of the bus release period are changed on the basis of the state of a request to use the bus.

It is preferable to provide means for interrupting the processing by the DMA transfer processing means when a request to use a bus is issued from the other device which is high in predetermined priority.

In a system in which an image memory storing image data, an image processor and a central processing unit for controlling the image memory and the image processor are connected to each other through a bus, a second image data transfer controller according to the present invention is an image data transfer controller for performing DMA transfer of the image data between the image processor and the image memory, which is characterized by comprising setting means provided in the central processing unit and setting the number of data to be continuously transferred and a bus release period, DMA transfer processing means for repeatedly performing transfer processing provided on the side of the image processor for acquiring a right to control a bus and performing DMA transfer of image data corresponding to the set number of data to be continuously transferred between the image processor and the image memory and bus release processing for releasing the acquired right to control a bus for the central processing unit during the set bus release period until a predetermined number of image data are transferred, and set value changing means provided in the central processing unit and monitoring the state of a request to use the bus and changing the set value of the number of data to be continuously transferred and the set value of the bus release period on the basis of the state of the request to use the bus.

In the second image data transfer controller according to the present invention, transfer processing for acquiring a right to control a bus and performing DMA transfer of image data corresponding to a set number of data to be continuously transferred between the image processor and the image memory and bus release processing for releasing the acquired right to control a bus for the central processing unit during a set bus release period are repeatedly performed until a predetermined number of image data are transferred. The set value of the number of data to be continuously transferred and the set value of the bus release period are changed on the basis of the state of the request to use the bus.

It is preferable that means for interrupting processing by the DMA transfer processing means when a request to use a bus is issued from the other device which is high in predetermined priority is provided in the central processing unit.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 4 is a timing chart showing control signals for acquiring a bus at the time of conventional burst transfer; and FIG. 5 is a timing chart showing control signals for acquiring a bus at the time of conventional cycle steal transfer.

DETAILED DESCRIPTION OF THE PREFERRED EMBODIMENTS

Description is now made of an embodiment in a case where the present invention is applied to a facsimile.

Figure 1:
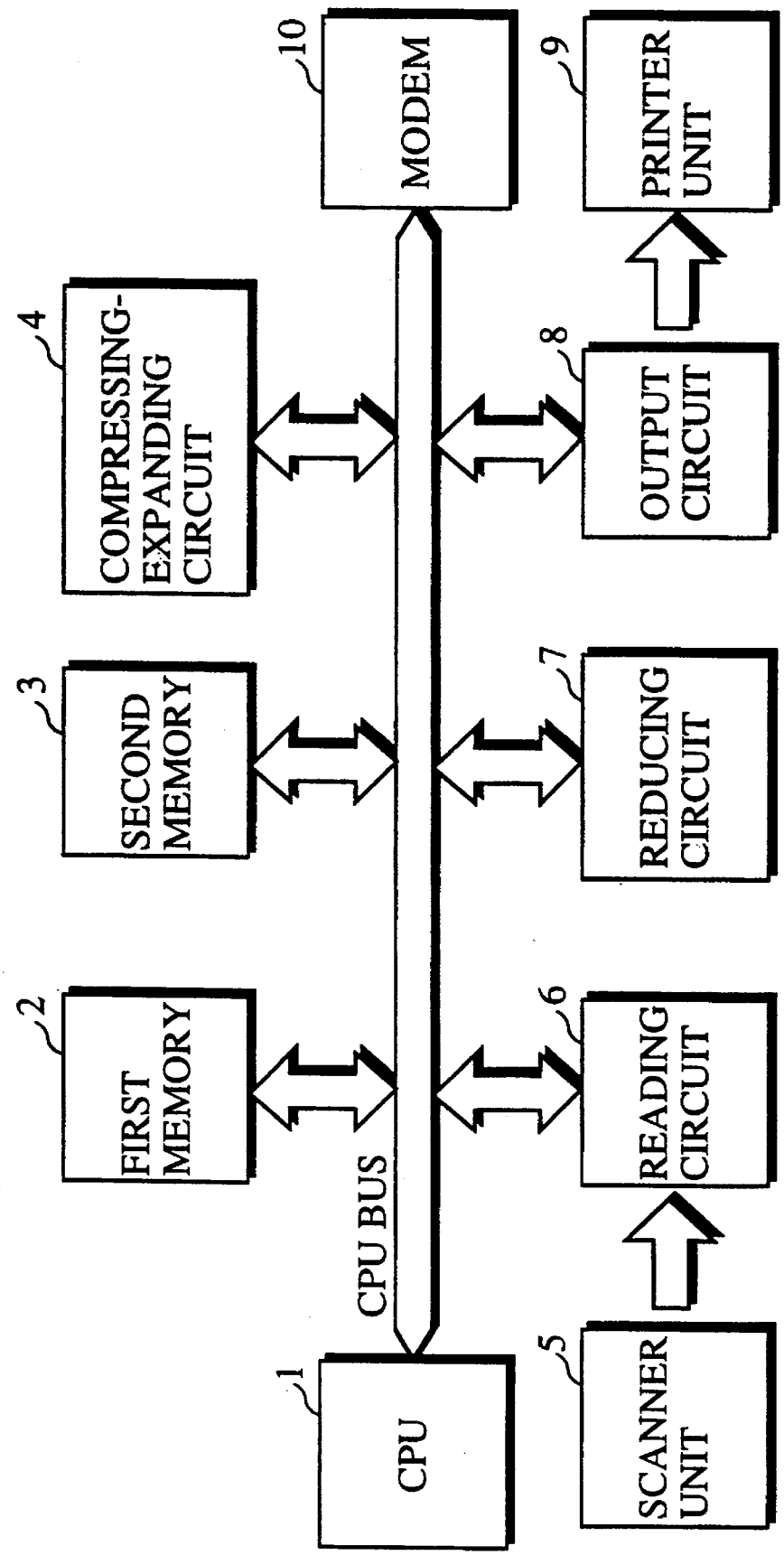
FIG. 1 is an electrical block diagram showing the entire construction of a facsimile.

FIG. 1 illustrates the construction of a facsimile.

The facsimile is controlled by a CPU 1 which is a main control unit. A first memory 2, a second memory 3, a compressing-expanding circuit 4, a reading circuit 6, a reducing circuit 7, an output circuit 8, and a modem 10 are connected to the CPU 1 through a CPU bus.

The reading circuit 6 controls a scanner unit 5, to read an original image. The compressing-expanding circuit 4 compresses transmitted data and expands data demodulated by the modem 10. The modem 10 modulate the transmitted data after the compression and demodulates received data. The reducing circuit 7 performs image processing for reducing image data. The output circuit 8 sends the image data to a printer unit 9. The printer unit 9 reproduces an image on paper on the basis of the sent image data.

Figure 2:
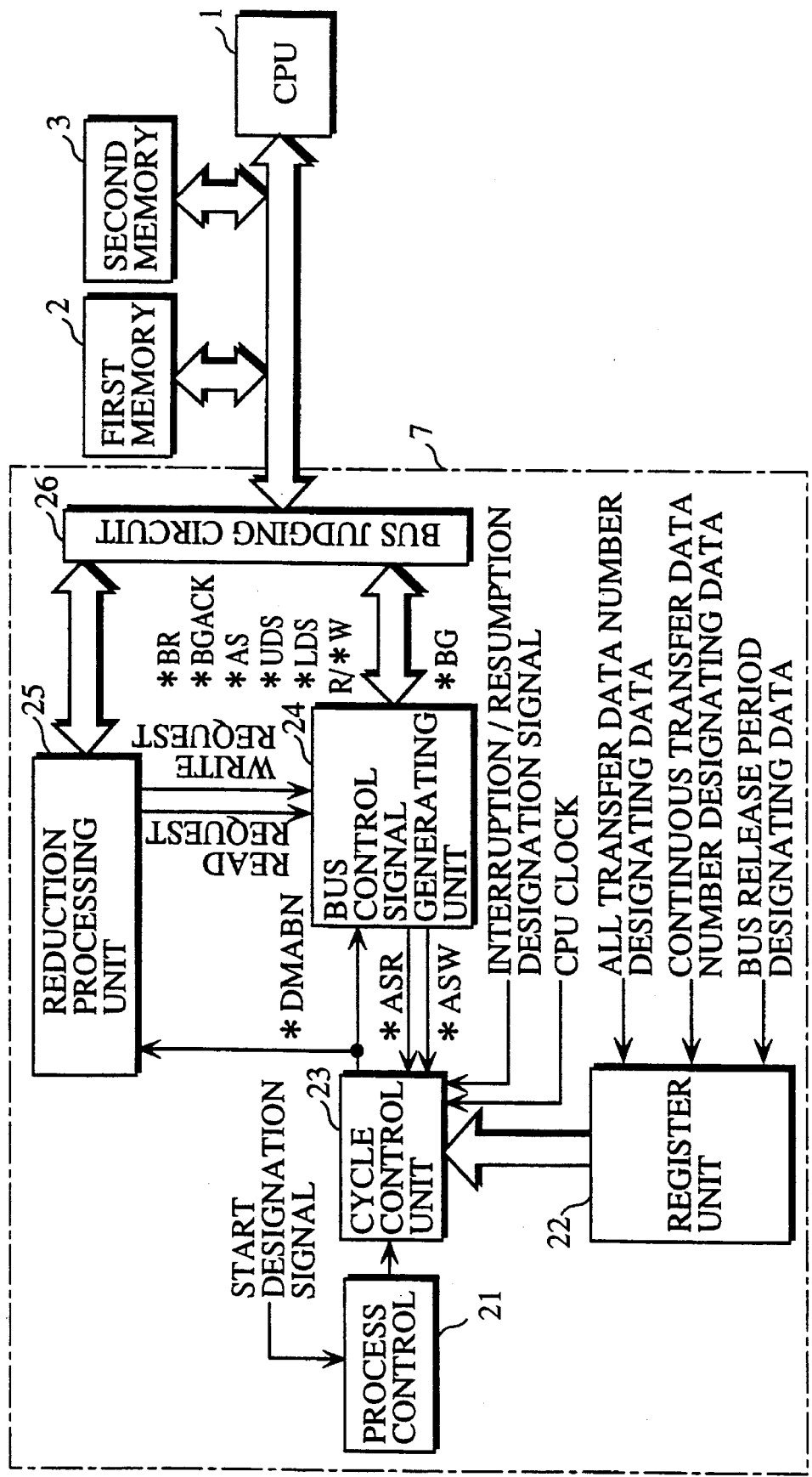
FIG. 2 is an electrical block diagram showing the construction of a reducing circuit shown in FIG. 1.

FIG. 2 illustrates the construction of the reducing circuit 7.

Figure 3:
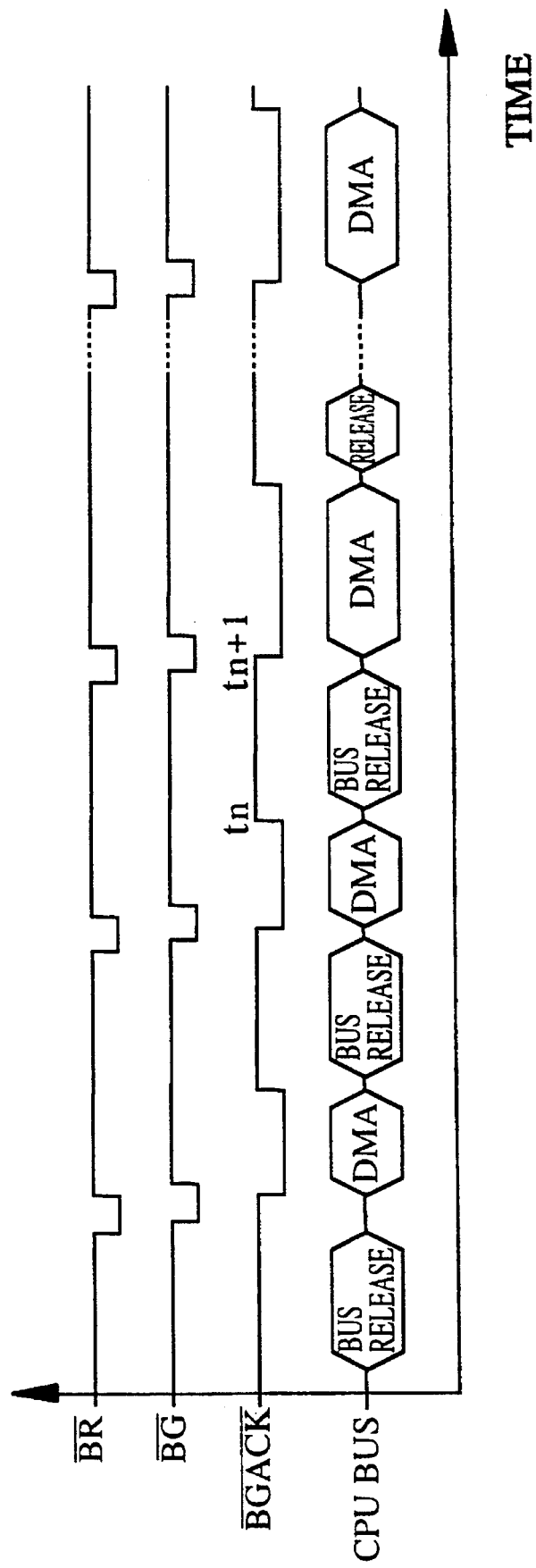
FIG. 3 is a timing chart showing signals of respective portions of the reducing circuit shown in FIG. 1.

Suppose a case where image data stored in a continuous address space of the first memory 2 is DMA transferred to the reducing circuit 7, where reduction processing is performed, and data after the reduction processing is stored in a continuous address space of the second memory 3. Transfer control signals of the reducing circuit 7 in this case are shown in FIG. 3. In this case, data produced by subjecting the image data transferred from the first memory 2 to reduction processing is stored once in a register (not shown). When reduced data whose number is not less than a predetermined number are stored in the register, the reduced data are DMA transferred to the second memory 3.

If the above described reduction processing is performed, total transfer data number designating data, continuous transfer data number designating data and bus release period designating data are sent to a register unit 22 from the CPU 1, and are stored in the register unit 22. The total transfer data number designating data is data for designating the total number of reduced data produced by subjecting image data corresponding to one line to reduction processing and the number of reduced data corresponding to one line which are transferred to the second memory 3 (the total number of data to be transferred).

The continuous transfer data number designating data is data for designating the number of image data to be transferred by one DMA transfer (the number of data to be continuously transferred). The bus release period designating data is data for designating a period set during each DMA transfer period and causing the CPU 1 to release the CPU bus (a bus release period). The bus release period is set using the number of CPU clocks (the set value of the bus release period).

A start designation signal is sent to a process control unit 21 from the CPU 1. If the start designation signal is sent to the process control unit 21 from the CPU 1, an execution permission signal is sent to a cycle control unit 23 from the process control unit 21, and a DMA enabling signal *DMAEN is asserted by the cycle control unit 23.

If the DMA enabling signal *DMAEN is asserted, a bus request signal *BR is asserted by a bus control signal generating unit 24. The CPU 1 releases the CPU bus, and then asserts a bus grant signal *BG at predetermined timing when the bus request signal *BR is asserted.

If the bus grant signal *BG is asserted, a bus grant acknowledge signal *BGACK is asserted by the bus control signal generating unit 24. Consequently, the reducing circuit 7 becomes a bus master.

Thereafter, an address strobe signal *AS to the first memory 2 is asserted at predetermined time intervals by the bus control signal generating unit 24, and a read/write signal R/*W is brought into an H level indicating a read cycle. The read/write signal R/*W is switched on the basis of a read request and a write request from a reduction processing unit 25. In addition, data strobe signals *UDS and *LDS are asserted and an address signal (not shown) is sent to the first memory 2 in synchronism with the address strobe signal *AS.

Every time the address strobe signal *AS is asserted, image data are read out one at a time from the first memory 2. The image data read out is DMA transferred through a bus judging circuit 26 to the reduction processing unit 25, where reduction processing is performed. Data after the reduction processing is stored in a register (not shown).

The bus control signal generating unit 24 outputs to the cycle control unit 23 a read address strobe signal *ASR which is synchronized with the address strobe signal *AS at the time of the read cycle. In addition, the bus control signal generating unit 24 outputs to the cycle control unit 23 a write address strobe signal *ASW which is synchronized with the address strobe signal *AS at the time of a write cycle, as described later.

The cycle control unit 23 is provided with a total transfer data number counter, a continuous transfer data number counter and a bus release period counter. The total transfer data number counter is incremented by one every time the write address strobe signal *ASW from the bus control signal generating unit 24 is asserted. The continuous transfer data number counter is incremented by one every time the read address strobe signal *ASR and the write address strobe signal *ASW from the bus control signal generating unit 24 are asserted. When the count value of the continuous transfer data number counter reaches the number of data to be continuously transferred which is set in the register unit 22, the DMA enabling signal *DMAEN is negated, and the count value is reset.

If the number of image data actually continuously transferred reaches the number of data to be continuously transferred which is set in the register unit 22, therefore, the DMA enabling signal *DMAEN is negated. If the DMA enabling signal *DMAEN is negated, the bus grant acknowledge signal *BGACK is negated by the bus control signal generating unit 24, whereby the CPU bus is released for the CPU 1.

If the CPU bus is released for the CPU 1, the bus release period counter in the cycle control unit 23 counts the number of inputted CPU clocks. If the count value reaches the set value of the bus release period which is stored in the register unit 22, the DMA enabling signal *DMAEN is asserted, and the count value is reset. Therefore, the CPU bus is released for the CPU 1 during the bus release period designated by the CPU 1.

If the DMA enabling signal *DMAEN is asserted, the bus request signal *BR is asserted again, whereby the above described series of operations is performed. Accordingly, the image data is transferred from the first memory 2 to the reduction processing unit 24, where the image data is subjected to reduction processing.

When as a result of repeating the above described processing, the number of reduced data produced after the reduction processing is performed is not less than a predetermined number and all image data corresponding to one line are transferred from the first memory 2 to the reducing circuit 7, where the reduction processing is terminated, the reduced data are transferred to the second memory 3 by the same operation as described above. In this case, the read write signal R/*W is brought into an L level indicating a write cycle. In the write cycle, the write address strobe signal *ASW which is synchronized with the address strobe signal *AS is sent to the cycle control unit 23 from the bus control signal generating unit 24.

While the above described operations are repeatedly performed, the CPU 1 monitors the state of a request to use the CPU bus. The CPU 1 changes the set value of the number of data to be continuously transferred and the set value of the bus release period which are stored in the register unit 22. This change is made while the CPU bus is released for the CPU 1.

For example, if a request to use a bus from a device other than the reducing circuit 7 is relatively frequent, the number of data to be continuously transferred with respect to the DMA transfer to the reducing circuit 7 is decreased, and the bus release period is lengthened. On the contrary, if the request to use a bus from the device other than the reducing circuit 7 is relatively less frequent, the number of data to be continuously transferred with respect to the DMA transfer to the reducing circuit 7 is increased, and the bus release period is shortened.

In the example shown in FIG. 3, during a bus release period between time points $t_n$ to $t_{n+1}$, the set value of the number of data to be continuously transferred and the set value of the bus release period are changed. Specifically, the set value of the number of data to be continuously transferred is large, and the set value of the bus release period is small. Consequently, after the time point $t_{n+1}$, the number of data to be continuously transferred is increased, and the bus release period is shortened.

The DMA transfer is repeatedly performed alternating with the bus release. If reduced data corresponding to the total number of data to be transferred which is set in the register unit 22 are transferred to the second memory 3 from the reduction processing unit 25, the transfer is detected by the total transfer data number counter in the cycle control unit 23, whereby the bus grant acknowledge signal *BGACK is negated, and the bus request signal *BR is prevented from being asserted. Consequently, DMA transfer processing of the image data corresponding to one line on the basis of the current start designation signal is terminated.

When a request to use a bus is issued from the other device which is very high in priority, the CPU 1 may sent an interruption signal to the cycle control unit 23 to temporarily interrupt DMA transfer. The DMA transfer after being temporarily interrupted may be resumed by sending a resumption signal from the CPU 1 to the cycle control unit 23.

Although in the above described embodiment, the set value of the number of data to be continuously transferred and the set value of the bus release period are changed by the CPU 1, the state of the request to use a bus may be judged by monitoring the state of the bus request signal *BR during the bus release period on the side of the reducing circuit 7 to change the set value of the number of data to be continuously transferred and the set value of the bus release period on the side of the reducing circuit 7 on the basis of the result of the judgment.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An image data transfer controller comprising:

setting means for setting the number of data to be continuously transferred and a bus release period;

direct memory access transfer processing means for repeatedly performing transfer processing for acquiring a right to control a bus and performing direct memory access transfer of image data corresponding to the set number of data to be continuously transferred and bus release processing for releasing the acquired right to control a bus during the set bus release period until a predetermined number of image data are transferred; and set value changing means for monitoring the state of a request to use said bus and changing the set value of said number of data to be continuously transferred and the set value of said bus release period on the basis of the state of the request to use the bus.

2. The image data transfer controller according to claim 1, wherein means for interrupting the processing by said direct memory access transfer processing means when a request to use a bus is issued from the other device which is high in predetermined priority is provided.

3. In a system in which an image memory storing image data, an image processor, and a central processing unit for controlling the image memory and the image processor are connected to each other through a bus, an image data transfer controller for performing direct memory access transfer of the image data between said image processor and said image memory, comprising:

setting means provided in said central processing unit and setting the number of data to be continuously transferred and a bus release period;

direct memory access transfer processing means for repeatedly performing transfer processing provided on the side of said image processor for acquiring a right to control a bus and performing direct memory access transfer of image data corresponding to the set number of data to be continuously transferred between said image processor and said image memory and bus release processing for releasing the acquired right to control a bus for said central processing unit during the set bus release period until a predetermined number of image data are transferred; and set value changing means provided in said central processing unit and monitoring the state of a request to use said bus and changing the set value of said number of data to be continuously transferred and the set value of said bus release period on the basis of the state of the request to use the bus.

4. The image data transfer controller according to claim 3, wherein means for interrupting processing by said direct memory access transfer processing means when a request to use a bus is issued from the other device which is high in predetermined priority is provided in said central processing unit.

5. The image data transfer controller according to claim 3, wherein said system is a facsimile, and said image processor is a reducing circuit for performing reduction processing with respect to the image data.

* * * * *